No. 751,016. PATENTED FEB. 2, 1904.
N. W. ROGERS.
SYSTEM OF ELECTRICAL DISTRIBUTION.
APPLICATION FILED FEB. 9, 1903.
NO MODEL.
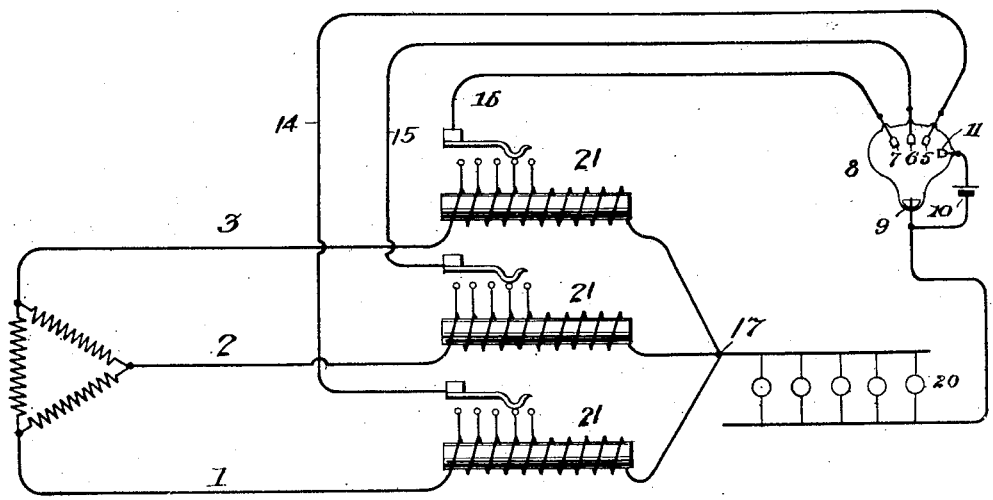
Witnesses
Nelson W. Rogers Inventor
By his Attorney No. 751,016. Patented February 2, 1904.

UNITED STATES PATENT OFFICE.

NELSON W. ROGERS, OF MOUNT VERNON, NEW YORK, ASSIGNOR TO COOPER HEWITT ELECTRIC COMPANY, A CORPORATION OF NEW YORK.

SYSTEM OF ELECTRICAL DISTRIBUTION.

SPECIFICATION forming part of Letters Patent No. 751,016, dated February 2, 1904.

Application filed February 9, 1903. Serial No. 142,458. (No model.)

*To all whom it may concern:*

Be it known that I, NELSON W. ROGERS, a citizen of the United States, and a resident of Mount Vernon, county of Westchester, State of New York, have invented certain new and useful Improvements in Systems of Electrical Distribution, of which the following is a specification.

It has been proposed to utilize an apparatus of the same general type as the well-known Cooper Hewitt lamp as a means for transmitting to a work-circuit currents of one direction from an alternating source. For this purpose a three-phase transformer has been employed as the source and the wires running from this transformer have been connected with three positive electrodes within a chamber containing besides the positive electrodes a suitable negative electrode and a conducting-vapor. The positive electrode may be of iron, and the negative electrode may be of mercury. It has been found that if the connections thus outlined are present and if the negative or mercury electrode is connected through a work-circuit to the neutral point of a three-phase transformer and if the reluctance to starting which exists primarily at the negative electrode is once overcome the currents supplied by the alternating source will pass through the gas or vapor in one direction, while the waves of opposite direction will be suppressed.

The means for starting the current in the first instance in the proper direction may consist of such devices as are described, for example, in certain Letters Patent of the United States issued to Peter Cooper Hewitt on the 17th day of September, 1901. The negative-electrode reluctance when once broken down may be maintained in that condition by connecting a source of direct current to a fourth electrode at the positive end of the container and also to the negative electrode. Such an arrangement will serve to control the direction of current-flow through the apparatus.

Beyond the rectifying apparatus thus described the negative electrode is connected through a work circuit or circuits with the neutral point of a three-phase transformer of star form.

The object of the present invention is to make it possible to utilize a multiphase current of any number of phases as the immediate source of alternating current and to provide a neutral point for such source when it is not otherwise available.

The drawing illustrating the invention is a diagram of one system of circuits and apparatus adapted to this end for use with a three-phase current.

The supply-circuit (shown at 1, 2, and 3) represents main conductors supplying multiphase current, which for convenience is represented as three-phase. The three wires 14, 15, and 16 lead from these mains, respectively, or from three compensating coils 21 21 21, one coil in each main, to three iron or mercury electrodes 5, 6, and 7 within a container 8. This container has a common negative electrode 9, of mercury.

The wires leading to the positive electrodes 5, 6, and 7 may be connected to any point of the windings on the compensating coils, and it is advantageous to construct the compensating coils with a number of taps leading to a device which will allow of the simultaneous shifting of the circuits leading to the positive electrodes, thus permitting any desired variation in the potential of the directional current above or below and independently of the potential of the alternating supply.

At 10 I show a source of direct current one pole of which is connected to an electrode 11 within the container, and the other pole is joined to the wire which connects with the negative electrode 9.

The work-circuit is shown at 20, and it may be a multiple arc or series circuit including current-consuming devices.

Beyond the compensating coils 21 the wires 1, 2, and 3 are brought together at a neutral point 17, which is joined to the work-circuit on the opposite side from the electrode 9.

Each of the compensating coils 21 supplies the entire work-current to the translating system during one-third of the time, and the organization of these coils must be planned with this demand in view.

Besides the means suggested for breaking down the negative-electrode resistance and for insuring that it shall be in that condition at the proper time any other suitable means may be employed.

I claim as my invention—

1. In an electrical distribution system, the combination of a multiphase circuit with a work or consumption circuit containing one or more translating devices, and a gas or vapor electric apparatus having positive electrodes and a common negative electrode, each positive electrode being connected to a separate terminal of the supply-circuit, and the negative electrode being connected with one side of the work or consumption circuit, and compensating coils also connected with the said supply-circuit at one end and connected at the opposite end with the opposite side of the work or consumption circuit.

2. In a system of electrical distribution, a multiphase circuit and a work or consumption circuit, in combination with multiple connections from the supply-circuit to opposite sides of the work-circuit, the connections to one side of the said circuit passing through compensating coils or devices, and the connections to the opposite side of the said circuit being made through a gas or vapor electric apparatus having a plurality of positive electrodes to which the leads from the supply-circuit are severally connected, and also having a negative electrode connected to one side of the work or consumption circuit.

3. In a system of electrical distribution, a multiphase supply-circuit and a work or consumption circuit, in combination with multiple connections from the supply-circuit to opposite sides of the work-circuit, the connections to one side of the said work-circuit passing through adjustable compensating coils or devices, thereby permitting a variation in the transmitted current independently of the alternating supply, and connections to the opposite side of the said circuit being made through a gas or vapor electric apparatus having a plurality of positive electrodes to which the leads from the supply-circuit are severally connected, and also having a negative electrode connected to one side of the work or consumption circuit.

Signed at New York, in the county of New York and State of New York, this 7th day of February, A. D. 1903.

NELSON W. ROGERS.

Witnesses:
WM. H. CAPEL,
C. O. SNYDER.